Nov. 18, 1941. C. L. GRIFFITH 2,263,383
WEIGHING SCALE
Filed April 11, 1938
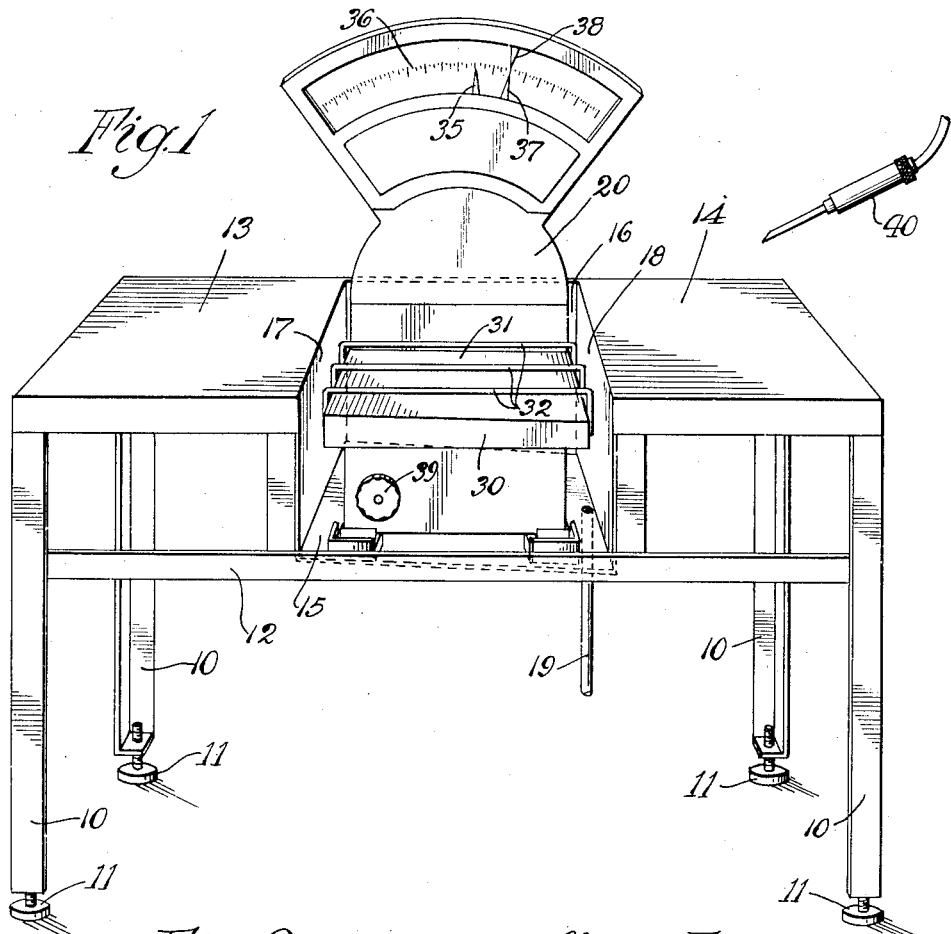
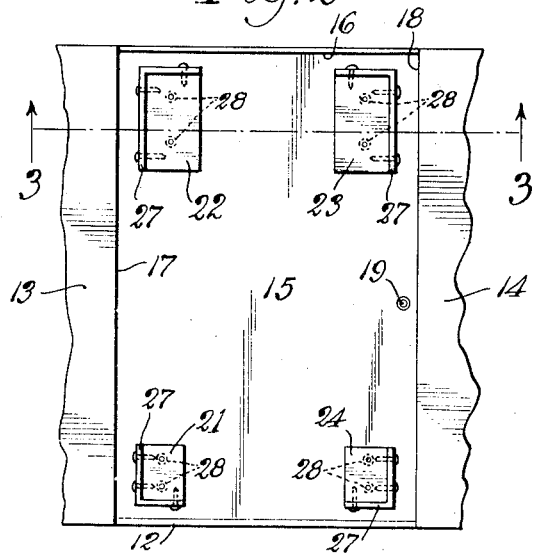
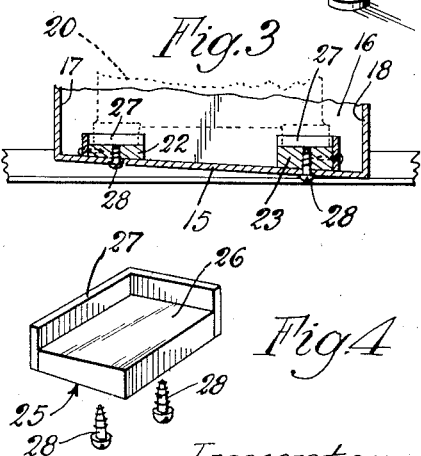
Inventor
Carroll L. Griffith
by W. Bartlett Jones
Attorney Patented Nov. 18, 1941

2,263,383

UNITED STATES PATENT OFFICE 2,263,383

WEIGHING SCALE

Carroll L. Griffith, Chicago, Ill., assignor to The Griffith Laboratories Inc., Chicago, Ill., a corporation of Illinois Application April 11, 1938, Serial No. 201,237

2 Claims. (Cl. 265—27)

The general object of the invention is to provide a device for weighing or treating weighed articles quickly and easily.

A particular object of the invention is to provide a device for pickling hams and the like by weight measurement.

The invention has resulted from use of weighing scales for pickling hams by artery pumping, and although it is specially adapted for such purpose, its utility is not thereby limited.

It is a practice to pickle hams by pumping a liquid pickle into the arteries of the ham. Recent developments in the art provide a scale for such purpose, on which the original ham is first weighed. Pickle liquor is pumped into the ham until the ham gains a given percentage in weight of pickle. Some of these scales are specially devised to indicate the stopping point without knowing the actual weight of the ham, or the final weight, as will be described below.

Since the pickle is pumped into the ham, while the ham is on the weighing scale, a certain degree of care must be exercised on ordinary scales to prevent spilled pickle, (or pickle not in the ham) being weighed also. The device is useful in packing plants where a large number of hams are treated in succession. It is therefore desirable to provide efficient handling methods. To these ends, the present invention applies.

Therefore, the invention is explained with particular reference to its use in pickling hams, but it is to be understood that for this use and other uses, changes and modifications may be made without the invention being limited to or by the exemplary embodiment shown in the accompanying drawing in which:

Fig. 1 represents a table with a recess into which is set a removable scale to bring its active platform level with the table.

Fig. 2 is a plan view into the recess showing the supports on which the scale is set.

Fig. 3 is a cross-section of the table on line 3—3 of Fig. 2.

Fig. 4 is a detailed view of one supporting block.

The device presents a bench surface, preferably on each side of a space adapted to receive a scale.

A portable table is preferred having four legs 10, each with a leveling screw 11. A frame 12 carries table top 13 at the left and table top 14 at the right. There is a recess between them having inclined floor 15, back wall 16, and side walls 17 and 18. The floor 15 pitches to the right toward drain 19. At the front the bar 12 of the frame may form or support a retaining wall for liquid at the front of the floor. The recess parts are made of suitable material, preferably noncorrosive metal, because the pickle is a brine having corrosive properties.

A portable weighing platform scale 20 sets into the recess on raised supports located on the floor 15. Four of these are shown, and are designated 21, 22, 23 and 24, being made preferably of wood. They have inclined bottoms 25 corresponding to the pitch of floor 15 and together they provide horizontal tops 26, all in one plane. A retaining angular metal strip 27 is placed on the outside corners to prevent the scale being pushed off these supports. They may be screwed to the floor 15 from the underside, as by screws 28.

The scale 20 has a platform 30, with its main top surface 31 inclined for drainage toward the floor drain 19, the whole being below the level of the table tops. The platform 30 carries a raised grid 32 made of separate bars, which grid is horizontal, and at the general level of the table tops for sliding hams from table 14, to the scale for pumping, then off to table 13. Thus an expert operator can quickly and easily pump hams brought to the tables and removed therefrom by one or more other operators. Or the table tops 13 and 14 may be sufficiently large for one operator to have supplies of raw and treated hams on the tables.

A typical scale has a weight needle 35 which can register the weight on dial range 36. The scale has mechanism whereby an auxiliary pointer, for example 37, registers a weight in excess of the original weight, say 10% above it. This indicates what the ham should weigh when pickled. There is also a manually operated pointer 38, controlled from knob 39 at the front of the scale, which is moved to register with the percentage needle 37. Then the ham is pumped with pickle by injection needle 40 until the true-weight needle 35 attains the goal marked by the manual pointer 38.

Various modifications and changes may be made without departing from the spirit and scope of the invention as expressed in the appended claims.

I claim:

1. A weighing scale having a liquid-draining weight-actuated platform, and a horizontal grid supported by said platform in position to hold articles being weighed on the grid, said platform being free from basins and horizontal areas capable of holding liquid whereby to permit liquid to drain through the grid and off the platform into non-weighing relation.

2. A scale having a scale-actuating weight-receiving member comprising in combination a horizontal weight-holding grid, and an inclined drainage means supporting said grid positioned vertically below and spaced from said grid with an area substantially coextensive with the area covered by the grid for draining away liquid falling through the grid, whereby said liquid is removed by drainage away from the said means to avoid affecting the indicated weight of an article on the grid.

CARROLL L. GRIFFITH.